United States Patent [19]

Lewis et al.

[11] 4,439,770

[45] Mar. 27, 1984

[54] CASCADED ADAPTIVE LOOPS

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 696,620

[22] Filed: Jun. 23, 1976

[51] Int. Cl.³ ........................... G01S 3/16; G01S 3/28
[52] U.S. Cl. .................................................. 343/381
[58] Field of Search ......................... 343/100 LE, 381

[56] References Cited

U.S. PATENT DOCUMENTS

| 3,202,990 | 5/1959 | Howells | 343/100 LE |
| 3,938,154 | 2/1976 | Lewis | 343/100 LE |
| 4,005,426 | 1/1977 | White | 343/100 LE |

*Primary Examiner*—Theodore M. Blum
*Attorney, Agent, or Firm*—Robert F. Beers; William T. Ellis; David G. Rasmussen

[57] ABSTRACT

A sidelobe-canceller system for cancelling jamming interference signals from a radar signal includes serially cascaded cancellation channels utilizing preprocessing cancellers and main-channel cancellers. The last serially cascaded cancellation channel includes terminal preprocessing cancellers and terminal main-channel cancellers. The preprocessing is improved by the use of AGC circuits connected one each between the terminal preprocessing cancellers and terminal main-channel cancellers to stabilize the gain of the terminal main-channel cancellers, thus improving the cancellation ratio and transient response of the system.

2 Claims, 3 Drawing Figures

CASCADED ADAPTIVE LOOPS

BACKGROUND OF THE INVENTION

1. Field of the Invention

The invention relates to a sidelobe-canceller system for cancelling jamming interference signals from a radar signal. More specifically, the sidelobe-canceller system utilizes preprocessing improved by the addition of an AGC circuit to stabilize gain and therefore improve the cancellation ratio and transient response of the system.

2. Description of the Prior Art

Generally, signal-processing systems are designed to reduce the presence of undesired signals in a signal-receiving system. As is known, in particular systems, such as a radar system, the characteristics of the receiving antenna are such that undesired signals which are received in the antenna sidelobes interfere with the detection of a target signal received in the main lobe. Accordingly, to reduce interference entering the sidelobes, sidelobe-canceller systems using adaptive canceller loops (hereinafter cancellers) have been used to cancel interference from the sidelobes of the main-radar antenna as exemplified by U.S. Pat. No. 3,202,990 to Paul W. Howells.

Conventionally, receiving systems employing cancellers have used auxiliary receivers to sample the environment in which undesired interference signals may be present. Each auxiliary signal forms an input which is used by a canceller in an attempt to eliminate undesired signals which may be present in conjunction with the desired signal in a main channel. Each canceller attempts to decorrelate its output from an auxiliary input signal by first phase shifting and amplitude weighting the auxiliary input signal and then subtracting this modified auxiliary signal from the main-channel signal.

Such systems as described above work well to eliminate main-channel interference with a single canceller when only one interference source is present. However, when multiple interference sources are involved, conventional systems have been ineffective in reducing cancellation even though multiple cancellers have been used. In theory, if N independent interference sources are present in a signal environment, the interference signals may be cancelled by multiple cancellers fed by inputs from N separate auxiliary receivers. In practice, however, it has been found that effective cancellation cannot be obtained unless the auxiliary-signal inputs are independent (i.e. decorrelated) of one another, in order to prevent the reintroduction of signals which have been cancelled in a previous main-channel canceller. In addition, conventional systems using parallel-connected cancellers have exhibited instabilities at the gains required for effective cancellation, and insufficient cancellation when constructed and operated over practically obtainable dynamic ranges.

In U.S. Pat. Nos. 3,938,153 and 3,938,154 entitled "SIDELOBE CANCELLER SYSTEM" to Bernard L. Lewis and Irwin B. Olin and "MODIFIED SIDELOBE CANCELLER SYSTEM" to Bernard L. Lewis, and assigned to the same assignee as the present application, iterative systems are disclosed which increase the cancellation over that of conventional systems. These techniques, however, require many iterative loops, with each loop requiring multiple cancellers before complete cancellation can be obtained.

In copending Patent Applications, Ser. No. 499,357 entitled "ADAPTIVE SIDELOBE CANCELLER SYSTEM" by Bernard L. Lewis and Ser. No. 508,774 entitled "SAMPLED DATA PROCESSING" by James P. Hansen, both assigned to the same assignee as the present application, systems are disclosed which preprocess the auxiliary signals to provide a plurality of independent signals which are used in the main-channel canceller system to cancel interference. Patent Application Ser. No. 508,774 describes a system using multiple preprocessing cancellers with each preprocessing canceller operating on the preprocessed output of the previous preprocessing canceller. This allows independent samples to be formed with a minimum number of preprocessing cancellers. These systems still have the disadvantage of having uncontrolled gain especially in the last main-channel canceller. This results in less than an optimum cancellation ratio and transient response.

Additionally, cancellers have used AGC circuits internally to stabilize gain. However, these circuits have been unable to completely control gain of the canceller since the gain is still variable with the auxiliary input signal.

SUMMARY OF THE INVENTION

The present invention provides a sidelobe-canceller system utilizing improved preprocessing. The sidelobe-canceller system may be composed of a single cancellation channel or serially cascaded cancellation channels. The single cancellation channel or the last serially cascaded cancellation channel would include terminal preprocessing cancellers and terminal main-channel cancellers. The improvement representing the present invention is the use of AGC circuits connected one each between the terminal preprocessing cancellers and the terminal main-channel cancellers. The purpose of the AGC circuits is to stabilize the gains of the terminal main-channel cancellers, the gains being proportional to the signal power from the terminal preprocessing cancellers, and in this way to improve the cancellation ratio and transient response of the sidelobe-canceller system.

An object of the invention is to provide a sidelobe-canceller system using improved preprocessing.

Another object of the invention is to provide a sidelobe-canceller system preperably using serially cascaded cancellation channels.

A further object of the system is to provide a sidelobe-canceller system having improved preprocessing resulting from the use of AGC circuitry to stabilize gain and therefore improve the cancellation ratio and transient response of the system.

DESCRIPTION OF THE PREFERRED EMBODIMENTS

Figure 1:
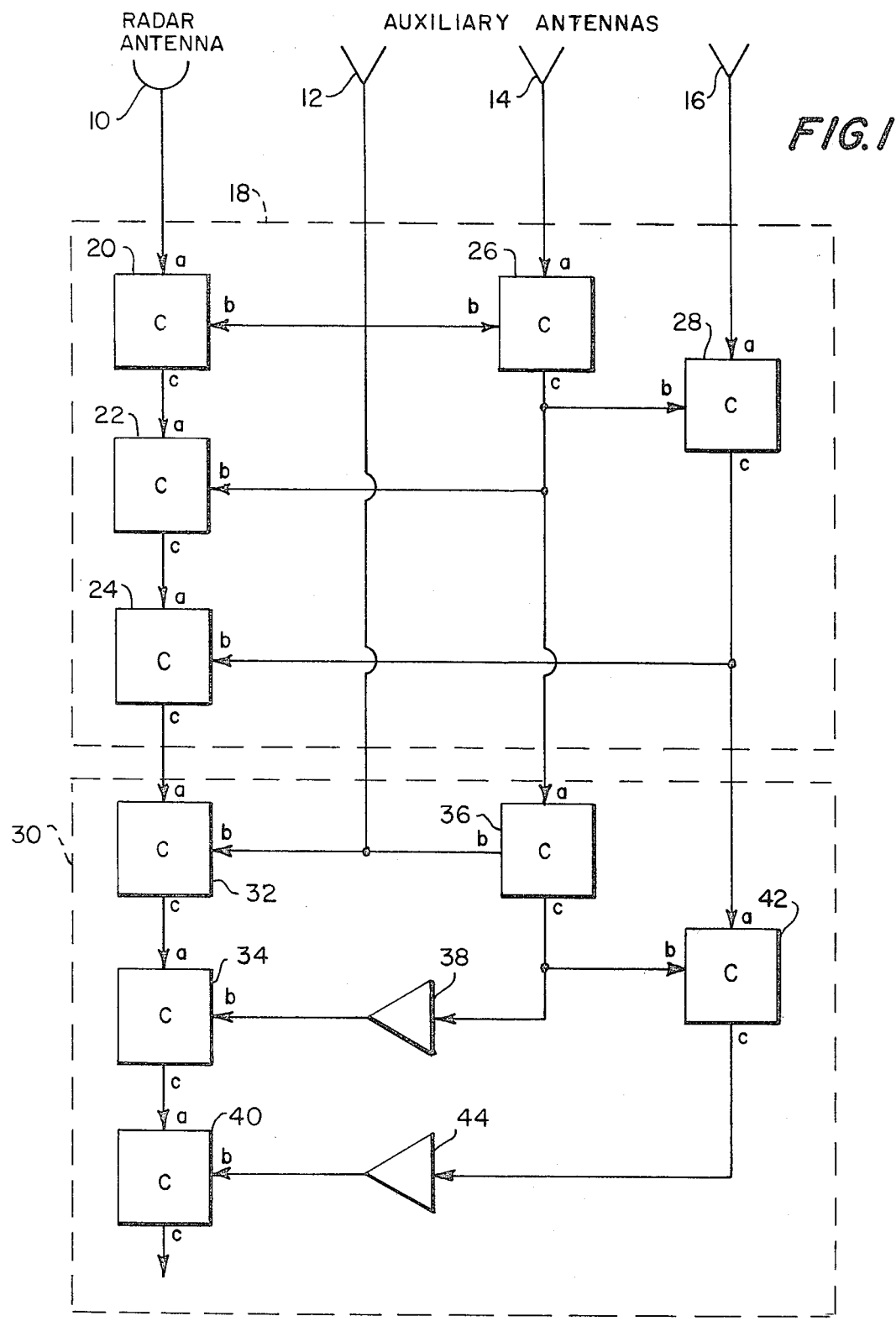
FIG. 1 is a block diagram representation of a sidelobe-canceller system utilizing cascaded cancellation channels and AGC circuits.

A sidelobe-canceller system utilizing cascaded cancellation channels and AGC circuitry outlined in FIG. 1. The invention will be described with reference to a radar system having a directional main-radar antenna 10 and three omnidirectional, auxiliary antennas 12, 14, and 16. Although only three auxiliary antennas are shown, additional auxiliary antennas may be added as required, since, a complete sidelobe-canceller system needs as many auxiliary antennas as there are jamming sources. Such a system is described in copending Navy application Ser. No. 508,774. Main-radar antenna 10 receives radar signals and any interference that may be present. Auxiliary antennas 12, 14, and 16 receive, primarily, interference from a plurality of jamming sources. For simplicity, the receivers from radar antenna 10 and auxiliary antennas 12, 14, and 16 have been omitted and are understood to be incorporated with the respective antennas.

Main-radar antenna 10 is connected to a first, cascaded cancellation channel 18 whose purpose it to preprocess interference signals and provide substantial cancellation of each interference signal received by the auxiliary antennas. Examples of cancellation channels are described in above referenced Patent Applications, Ser. No. 508,774 and Ser. No. 499,357. For illustrative purposes, FIG. 1 shows a system such as described in Patent Application Ser. No. 508,774, hereby incorporated by reference, by utilizing only three antennas. In first cascaded cancellation channel 18, main-channel canceller 20 is connected to radar antenna 10. Additionally included in first cascaded cancellation channel 18 are main-channel cancellers 22, 24 and preprocessing cancellers 26, 28. The cancellers are identical and will be described subsequently with reference to FIG. 3. Main-channel canceller 20 receives signals containing radar information and jamming interference from radar antenna 10 at input a and additionally, receives interference signals from auxiliary antenna 12 at input b. Main-channel canceller 20 decorrelates its output at c from the auxiliary antenna 12 input at b and feeds the output to input a of main-channel canceller 22. Preprocessing canceller 26 receives interference signals from auxiliary antenna 12 at input b and interference signals from auxiliary antenna 14 at input a. The output at c is decorrelated from the auxiliary antenna 12 input at b and is fed to input b of main-channel canceller 22. Main-channel canceller 22 decorrelates its output from the signal received at input b and provides an output c to main-channel canceller 24. Preprocessing canceller 28 receives interference signals from auxiliary antenna 16 at input a and the preprocessed signal from preprocessing canceller 26 at b. Preprocessing canceller 28 decorrelates its output from the preprocessed signal at input b and provides the output to main-channel canceller 24. Main-channel canceller 24 decorrelates its output from the signal received at input b and provides an output c which contains radar information with the interference from each jamming source substantially reduced by cancellation.

The output c is fed to a second, cascaded cancellation channel 30 which is identical to the first cascaded cancellation channel 18 except for the addition of AGC circuitry to be described subsequently. Specifically, the output of main-channel canceller 24 is fed to input a of main-channel canceller 32 which decorrelates its output c from interference signals received from auxiliary antenna 12 at input b. The signals are fed to input a of terminal main-channel canceller 34. Terminal preprocessing canceller 36 receives the unaltered interference signal from auxiliary antenna 12 at input b and the decorrelated signal from output c of first preprocessing canceller 26 at input a. Preprocessing canceller 36 decorrelates its output c from the auxiliary antenna 12 signal and feeds the output to automatic-gain-control (AGC) circuit 38. AGC 38 may, for example, be a conventional AGC circuit consisting of a variable-gain voltage amplifier, a detector, and a low-pass filter whose output is fed back to control the gain of the amplifier. The output of AGC 38 is connected to input b of terminal main-channel canceller 34 which decorrelates its output c from the input at b.

This output is fed to input a of terminal main-channel canceller 40. Terminal preprocessing canceller 42 receives a preprocessed signal from preprocessing canceller 28 at a and a preprocessed signal from terminal preprocessing canceller 36 at b. Terminal preprocessing canceller 42 decorrelates its output c from the input at b and provides the output at AGC 44 which is identical to AGC 38. The output of AGC 44 is fed to input b of terminal main-channel canceller 40 which decorrelates its output from the input at b. The output of terminal main-channel canceller 40 is a signal containing radar information with the interference from each jamming source reduced substantially from the amount present at the output of first, cascaded cancellation channel 18.

Figure 2:
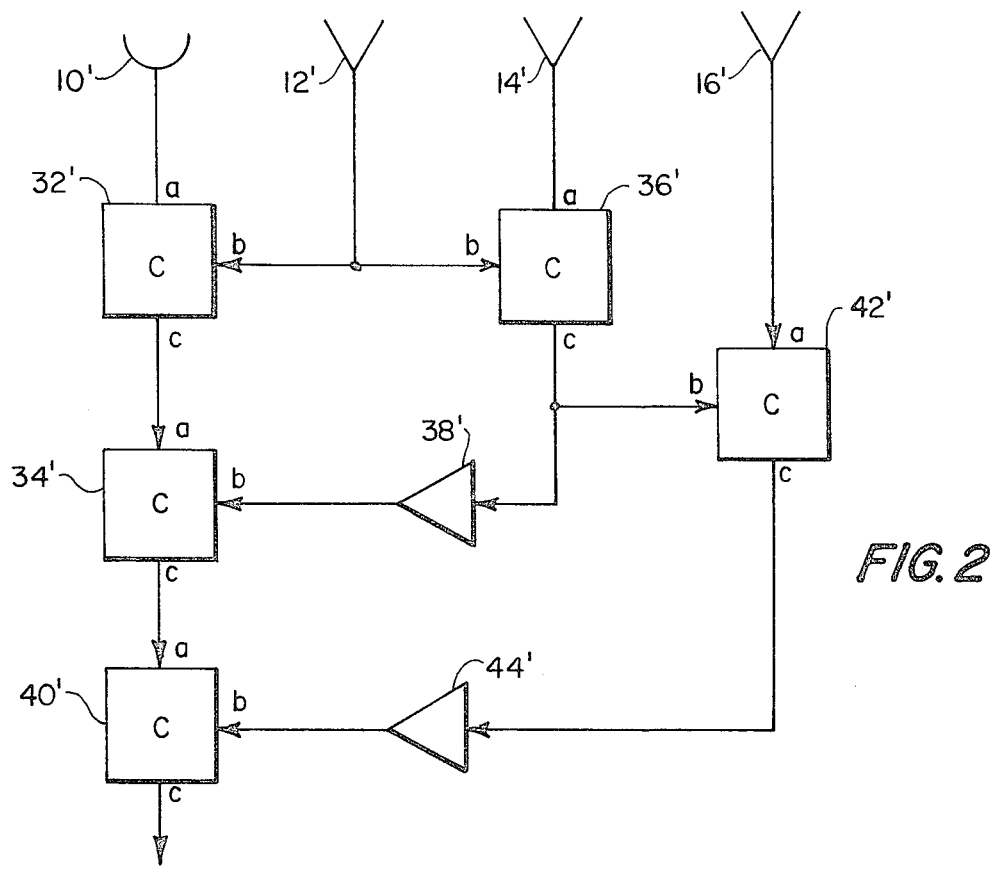
FIG. 2 is a block diagram representation of a sidelobe-canceller system utilizing a single cancellation channel and AGC circuits.

FIG. 2 shows a single, non-cascaded, preprocessing canceller system utilizing AGC which is an alternative embodiment to the cascaded system using AGC of FIG. 1. The following components of FIG. 2 are shown as identical to corresponding components of FIG. 1 and are labeled with corresponding primed numbers: main-radar antenna 10'; auxiliary antennas 12', 14', 16'; main-channel cancellers 32'; terminal main-channel cancellers 34, 40; terminal preprocessing cancellers 36', 42'; and AGC circuits 38', 44'.

Main-radar antenna 10 provides radar signals to input a of main-channel canceller 32'. Main-channel canceller 32' additionally receives interference signals from auxiliary antenna 12' through input b. Main-channel canceller 32' decorrelates its output c from the signal at input b and provides the output to input a of main-channel canceller 34'. Terminal preprocessing canceller 36' receives interference signals from auxiliary antennas 12', 14', at inputs a and b, respectively. Terminal preprocessing canceller 36' decorrelates its output from the input at b and feeds the output through AGC 38' to input b of terminal main-channel canceller 34'. Terminal main-channel canceller 34' decorrelates its output c from the input at b and feeds the output to terminal main-channel canceller 40'. Terminal preprocessing canceller 42' receives the preprocessed output from terminal preprocessing canceller 36' at input b and interference signals from auxiliary antenna 16' at input b. Terminal preprocessing canceller 42' decorrelates its output c from the input at b and feeds the output through AGC 44' to input b of terminal main-channel canceller 40'. Terminal main-channel canceller 40' decorrelates its output c from input b. The radar signal, with substantially reduced interference signals, is provided at the output of terminal main-channel canceller 40'.

Figure 3:
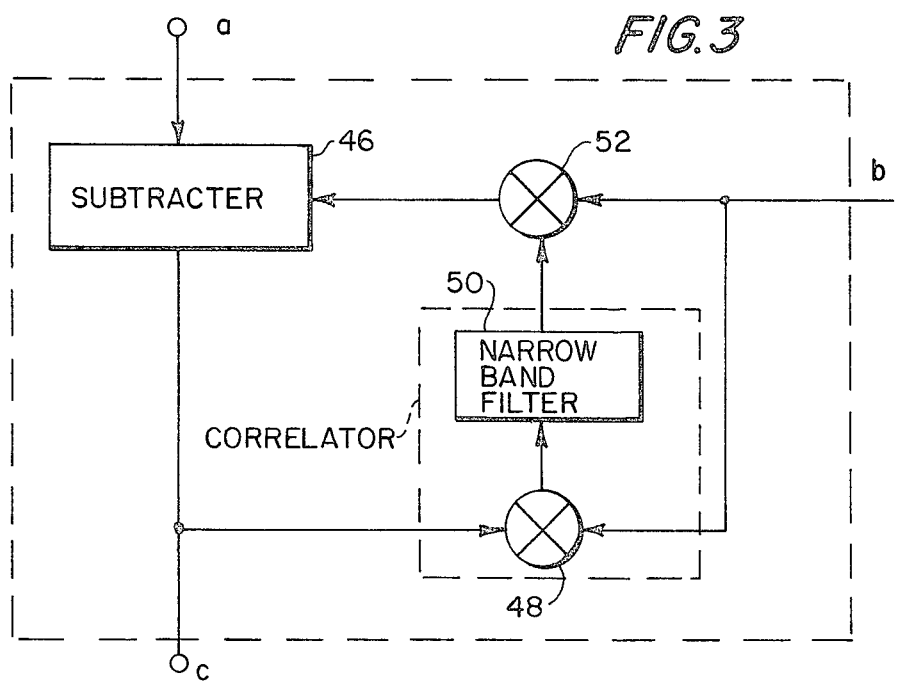
FIG. 3 is a schematic diagram showing the elements of a conventional canceller loop.

FIG. 3 is an example of a common, adaptive canceller loop that might be used as each canceller C of the present invention. The construction and operation of such a canceller is well-known, as taught by the patent to Howells U.S. Pat. No. 3,203,990. The canceller is constructed to have inputs at a and b which correspond to those inputs a and b of the cancellers of FIGS. 1 and 2. A subtracter 46 is coupled to receive input a while its output c is coupled along with input b to mixer 48. The output of mixer 48 is coupled through narrow-band filter 50 to mixer 52 where it is combined with the signal from input b. The output of mixer 52 is coupled back to subtracter 46 where it it subtracted from the input at a to produce the canceller output at c. As is known in the art, mixer 48 and narrow-band filter 50 form a correlator which produces a weighting function designed to control the phase and amplitude of the signal input at b in mixer 52 to decorrelate the signal out of subtractor 46 from the input at b. As is also known, since the speed of response of the canceller is proportional to loop gain, and since loop gain is proportional to auxiliary signal power, a canceller will tend to cancel signals such as interference signals having high average power, while being relatively insensitive to signals such as radar returns. It should also be realized that any known adaptive loop, designed for decorrelating signals, may be used in place of the described canceller.

In operation, the signal received by radar antenna 10 includes a radar-signal carrier modulated by the radar signal and a plurality of jammer carriers having the same frequency but different amplitude and phase and modulated by the jammer waveform. Auxiliary antennas 12, 14, 16 of FIG. 1 sample the environment in which the radar is attempting to operate and receive interference from a plurality of jammers. Since multiple jammer signals are received by each auxiliary antenna 12, 14, 16 the composite received signal for each auxiliary antenna is not independent from the others. In other words, there are signal components on each antenna that are correlated and also components that are uncorrelated.

In the first cancellation channel 18, the composite interference signal from auxiliary antenna 12 is coupled to preprocessing canceller 26 which also receives a second composite interference signal from auxiliary antenna 14. The output of preprocessing canceller 26 is decorrelated from the input from auxiliary antenna 12 such that the preprocessed output of c is independent of the signal from auxiliary antenna 12, which is also used as the input to main-channel canceller 20. Preprocessing canceller 28 in a similar manner receives the preprocessed output from preprocessing canceller 26 and the composite interference signal from auxiliary antenna 16 to produce an output decorrelated from the preprocessed signal of preprocessing canceller 26. If more auxiliary antennas and preprocessing cancellers were used, each preprocessed signal would be independent of the previous preprocessed signal. The signal from auxiliary antenna 12 and the independent preprocessed outputs from preprocessing cancellers 26 and 28 are then fed to main-channel cancellers 20, 22, 24 respectively. The outputs of main-channel cancellers 20, 22, 24 are decorrelated from the preprocessed inputs to provide cancellation of interference as will be explained subsequently. Main-channel canceller 20 receives the composite interference signal from antenna 12 and the radar signal from antenna 10. The output of main-channel canceller 20 is decorrelated from the interference signal of auxiliary antenna 12. Some cancellation of the interference signal has taken place at this point. The decorrelated output is then fed to main-channel canceller 22 which also receives the preprocessed output from preprocessing canceller 26. The output of main-channel canceller 22 is decorrelated from the preprocessed output. Similarly, the output of main-channel canceller 24 is decorrelated from the output of preprocessing canceller 28. If additional main-channel cancellers and preprocessing cancellers are used, the main-channel cancellers will decorrelate their outputs from the additional preprocessing canceller outputs. Since the auxiliary antenna 12 signal and the following preprocessed signals constitute all parts of the interference in the main radar signal. The successive operation of each main-channel canceller on the output residue of the previous main-channel canceller allows for cancellation of interference from the main-radar signal.

The second cancellation channel 30 is identical to the first cancellation channel 18 except for the addition of AGC circuits 38, 44; hence, a detailed description of the operation is unnecessary except with respect the AGC circuits. In brief, the output from main-channel canceller 24 of first preprocessing channel 18 is fed to the input of main-channel canceller 32 which receives a signal from auxiliary antenna 12 and provides a decorrelated output to terminal main-channel canceller 34. Additionally, a preprocessing canceller 36 receives the signal from auxiliary antenna 12 and the preprocessed output from preprocessing canceller 26. Decorrelation takes place in preprocessing canceller 36 and an output is fed to AGC 38. The purpose of AGC 38 is to improve the performance of second cancellation channel 30 by stabilizing the gain of terminal main-channel canceller 34. A gain in terminal main-channel canceller 34 independent of the input from terminal preprocessing canceller 36 is desired to provide optimum interference cancellation. To maintain a stable high gain for terminal main-channel canceller 34, it is necessary to have a stable strong signal at input b, since gain is dependent on the power level of this input. AGC 38 performs the function of maintaining a strong signal at input b. If the signal from auxiliary antenna 12 and the preprocessed output from preprocessing canceller 26 are correlated, there will be cancellation in preprocessing canceller 36 and its output at c will be low. AGC 38 will amplify the low signal to a level that will keep the gain of terminal main-channel canceller 34 at a stable level. If the auxiliary antenna 12 signal and output of preprocessing channel 26 are uncorrelated, little cancelling will occur in preprocessing canceller 36 and AGC 38 will reduce gain to maintain stable operation of terminal main-channel canceller 34. The circuit, including terminal preprocessing canceller 42, AGC 44, and terminal main-channel canceller 40, operates in the above described manner and stabilizes the gain of terminal main-channel canceller 40 to provide optimum interference cancellation. It is noted that prior art AGC circuits, previously mentioned, are included in a canceller (with reference to FIG. 3) between the input b and mixer 48. Their sole purpose is to partially limit the amplitude of the signal at input b to prevent oscillation of the canceller. In contrast, the AGC circuit of the present invention is located differently to control the amplitude of the input signal at b completely and thus control the level of gain of the canceller to optimize interference cancellation. The AGC of the present invention compensates for varying degrees of correlation between the signals received by the auxiliary antennas that result in varying output levels from the terminal preprocessing cancellers. Results are optimum with the AGC circuits connected between preprocessing cancellers 36, 42 and main-channel cancellers 34, 40. AGC circuits inserted between preprocessing cancellers 26, 28 and main-channel cancellers 22, 24 will not significantly improve interference cancellation in the cascaded system. However, they do in a non-cascaded systems as shown in FIG. 2.

The cancellation system shown in FIG. 2 is identical to second cancellation channel 30 of FIG. 1 except for the connections of the circuit to antennas 10', 12', 14', 16'. Operation of the circuit and the AGC is the same as that described for FIG. 1.

The sidelobe canceller system desclosed in application Ser. No. 508,774 results in substantial cancellation of interference signals from all jammers. However, the addition of an AGC circuit to such a system, as shown in FIG. 2, increases the cancellation ratio and transient response of the system. Furthermore, cascading of two or more cancellation stages and adding AGC circuitry in the last cascaded stage results in further improved cancellation and transient response. The improved cancellation and transient response are obtained because the cascaded system bandwidth and gain are increased by cascading in a manner that does not introduce danger of instability and oscillation. The cascaded gain and bandwidth permit the individual loop gains to be made low enough for unconditional stability.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A sidelobe canceller system utilizing preprocessing to cancel multiple jamming interference signals, said system including a plurality of serially cascaded cancellation channels, said system comprising:
    main-radar antenna means for receiving a radar signal;
    a plurality of auxiliary antenna means for receiving signals from a jamming interference environment, one of said auxiliary antenna means constituting a first auxiliary antenna means;
    a plurality of serially connected cancellation channels each said cancellation channel including:
    means for receiving and preprocessing the outputs of said plurality of auxiliary antenna means to decorrelate the outputs of said plurality of auxiliary antenna means;
    a plurality of serially connected main channel cancellers, the first main channel canceller of the first cancellation channel receiving the output of said first auxiliary antenna means and said main radar antenna and the first serial main channel canceller of the remaining cancellation channels receiving the outputs of said first auxiliary antenna means and the output of the last main channel canceller of the proceeding cancellation channel, the remainder of said main channel cancellers of each cancellation channel receiving decorrelated auxiliary antenna outputs from said means for receiving and processing; and
    a terminal cancellation channel including:
        terminal means for receiving and preprocessing the outputs of said plurality of auxiliary antenna means to decorrelate the outputs of said plurality of auxiliary antenna means;
        a plurality of serially connected, terminal main channel cancellers, the first serial terminal main channel canceller receiving the output of said first auxiliary antenna means and the output of the last main channel canceller of the last serial cancellation channel, the remainder of said terminal main channel cancellers receiving the auxiliary antenna outputs from said means for receiving and preprocessing; and
        a plurality of AGC means, each of which receives one of said auxiliary antenna outputs from said terminal means for receiving and preprocessing and provides an output to one of said terminal main channel cancellers.

2. A sidelobe-canceller system utilizing preprocessing to cancel multiple jamming interference signals, which comprises:
    main-radar antenna means for receiving a radar signal;
    a plurality of auxiliary antenna means for receiving signals from a jamming interference environment, one said auxiliary antenna means constituting a first auxiliary antenna means;
    a plurality of sequentially connected terminal preprocessing cancellers, the first of said sequence of cancellers receiving the output of said first auxiliary antenna means and the output of one other said plurality of auxiliary means, the remaining terminal preprocessing cancellers of said sequence each receiving the output of the preceeding sequential terminal preprocessing canceller and the output of one of said auxiliary antenna means;
    a first main-channel canceller receiving the output of said main-radar antenna means and the output of said first auxiliary antenna means;
    a plurality of serially connected, terminal main-channel cancellers, the first canceller of said series receiving the output of said first main-channel canceller, each said terminal main-channel cancellers receiving the output of one of said plurality of terminal preprocessing cancellers; and
    AGC means connected one each between said terminal preprocessing cancellers and said terminal main-channel cancellers for controlling the amplitudes of the signals transferred between said terminal preprocessing cancellers and said terminal main-channel cancellers.

* * * * *